United States Patent [19]

Satoyoshi

[11] Patent Number: 5,228,824
[45] Date of Patent: Jul. 20, 1993

[54] APPARATUS FOR AUTOMATIC PLACEMENT AND COLLECTION OF CHAIRS

[75] Inventor: Akio Satoyoshi, Yokohama, Japan

[73] Assignee: Kanto Jidosha Kogyo Kabushiki Kaisha, Yokosuka, Japan

[21] Appl. No.: 767,999

[22] Filed: Sep. 30, 1991

[30] Foreign Application Priority Data

Dec. 18, 1990 [JP] Japan .................................. 2-411347
Dec. 18, 1990 [JP] Japan .................................. 2-411348
Dec. 18, 1990 [JP] Japan .................................. 2-411349
Dec. 18, 1990 [JP] Japan .................................. 2-411350

[51] Int. Cl.[5] ............................................. B65G 61/00
[52] U.S. Cl. .................................. 414/501; 414/352; 414/434; 414/498; 414/789.7
[58] Field of Search ............... 414/331, 334, 338, 349, 414/350, 352, 434, 498, 501, 502, 525.1, 788.2, 789.7, 795.6, 798.4; 198/801

[56] References Cited

U.S. PATENT DOCUMENTS

| 3,471,047 | 10/1969 | Burke ............................. 414/350 X |
| 4,077,535 | 3/1978 | Oriol ................................... 414/498 |
| 4,318,655 | 3/1982 | Svensson ............................ 414/434 |
| 4,597,706 | 7/1986 | Michit ............................. 414/788.2 |
| 5,088,872 | 2/1992 | Asawa et al. ....................... 414/352 |

FOREIGN PATENT DOCUMENTS 0150633  6/1989  Japan ................................ 414/798.4

OTHER PUBLICATIONS

Japanese Gazette No. 3-74706, "Apparatus For A Collection of Chairs", Mar. 29, 1991.
Japanese Gazette No. 3-85106, "Apparatus For Placement And Collection Of Chairs", Apr. 10, 1991.
Japanese Gazette No. 3-99608, "Apparatus For Placement And Collection Of Chairs", Apr. 24, 1991.

Primary Examiner—Michael S. Huppert
Assistant Examiner—James Keenan
Attorney, Agent, or Firm—Hoffmann & Baron

[57] ABSTRACT

An apparatus for automatic placement and collection of chairs having a dolly allowing a large number of chairs stacked in a horizontal direction to be loaded thereon, the dolly having a base on which the front legs on the lateral sides of the chairs can be positioned while being inclined frontward, and also having a horizontal chair-guide bar capable of being inserted through the space between the front and rear legs of each chair for supporting the chair from below and for guiding the chair in the direction in which the chair is moved for placement or collection. The apparatus also has a motive power unit removably mounted on the dolly, the unit having a dolly lifting device for lifting the dolly from the floor, a chair holding device mounted on a pair of rails capable of being disposed in a space below the chair-guide bar, and provided to hold and move each chair between the chair-setting position on the floor and the chair-collecting position on the chair-guide bar, and driving and steering wheels for free movement on the floor.

6 Claims, 9 Drawing Sheets

APPARATUS FOR AUTOMATIC PLACEMENT AND COLLECTION OF CHAIRS

BACKGROUND OF THE INVENTION

1. Field of the Invention

The present invention relates to an apparatus for automatic placement and collection of chairs which, in a meeting hall, a gymnasium or the like, allows a large number of chairs, either in a singular form or in the form of groups each comprising a plurality of chairs connected together, to be automatically collected by stacking the chairs on a dolly or dollies, and allows such stacked chairs to be automatically placed for use.

2. Brief Description of the Related Art

An automatic placement and collection apparatus of the above-described type is known from Japanese Patent Laid-Open Hei 1-150633. This apparatus is adapted to collect chairs along horizontal, chair-hanging rails by bringing the chairs into the state of being held by a holder engaging with a groove formed in the back of each chair, and place chairs by moving the holder backward.

The apparatus includes a dolly onto which chairs are collected, and power equipment for automatically placing and collecting chairs and for moving the dolly. Since the power equipment is integrally mounted on the dolly, the entire structure of the dolly is bulky and expensive, and is inconvenient to the use of a plurality of such dollies.

SUMMARY OF THE INVENTION

Accordingly, an object of the present invention is to provide an apparatus for automatic placement and collection of chairs that includes power equipment which can be used in common with a plurality of dollies.

When a dolly travels with a motive power unit mounted thereon, the movement of the wheels of the dolly may influence the travel to make smooth steering and travel difficult. In view of this fact, another object of the present invention is to provide a dolly lifting device for lifting a dolly that has a simple structure and can be used in an apparatus for automatic placement and collection of chairs.

Still another object of the present invention is to provide an apparatus for automatic placement and collection of chairs that has a simple structure and is adapted to handle chairs in groups each comprising a plurality of chairs connected together.

A further object of the present invention is to provide a chair-holding hook mechanism of an apparatus for automatic placement and collection of chairs, the hook mechanism employing weights without employing an actuator.

According to the present invention, an apparatus for automatic placement and collection of chairs comprises: a dolly allowing a large number of chairs stacked in a horizontal direction to be loaded thereon, the dolly having a base on which the front legs on the lateral sides of the chairs are positioned while being inclined frontward, and also having a horizontal chair-guide bar capable of being inserted through the space between the front and rear legs of each chair for supporting the chair from below and for guiding the chair in the direction in which the chair is moved for placement or collection; and a motive power unit removably mounted on the dolly. The motive power unit has a dolly lifting device for lifting the dolly from the floor, a chair holding device including a holding device body mounted on a pair of rails capable of being disposed in a space below the chair-guide bar and a holding position controller for moving the holding device body between the chair-setting position on the floor and the chair-collecting position on the chair-guide bar, and driving and steering wheels for free movement on the floor.

According to the present invention, if a plurality of dollies the number of which corresponds to the number of chairs in a group are used, and simultaneously if one or more motive power units, separable from dollies, are used in common with the dollies, the number of the motive power units is smaller than the number of the dollies. Thus, it is possible to simplify the entire structure of the apparatus, and this is very advantageous in respect of cost. Another advantage is that, even when a failure has occurred in a motive power unit, the dolly on which the unit has been mounted can still be used as a dolly. Since each chair is supported by the horizontal chair-guide bar in a leaning frontward position, the structure of the apparatus is simple. Since the position by which each chair is supported is a position below the seat, wear or scratches which might occur as a result of loading or unloading are less conspicuous. When a motive power unit for automatic handling of chairs and automatic travel is mounted on a dolly for collecting chairs, since the dolly can be lifted by the dolly lifting device, it is possible to eliminate the influence of the wheels of the dolly and achieve smooth steering and travel. In this way, an operation of placing or collecting chairs can be performed efficiently. The lifting device is realized by a simple structure in which driving members press against certain members to be pressed which are on either lateral side of the dolly.

If a chair-holding hook mechanism is constructed employing weights without employing an actuator, this makes it possible to realize a chair holding device which is simple in structure and inexpensive, and in which failures do not occur easily. Since the portion by which each chair is held is not clamped, there is no risk of the portion being worn or scratched.

If a plurality of dollies are arranged side by side and connected together in such a manner that the chair-guide bars belonging to these dollies can be simultaneously inserted through the spaces between the front and rear legs of a plurality of chairs arranged side by side and connected together, and simultaneously if a plurality of motive power units, arranged side by side and connected together, are removably mounted on the plurality of dollies with a dolly lifting device being provided in each of the motive power units and chair holding devices being provided in only those two motive power units at the two outer positions of the row, an apparatus for handling chairs in groups is simplified, thereby providing an advantage with regard to cost and an improvement in the operation efficiency.

DETAILED DESCRIPTION OF THE INVENTION

Figure 12:
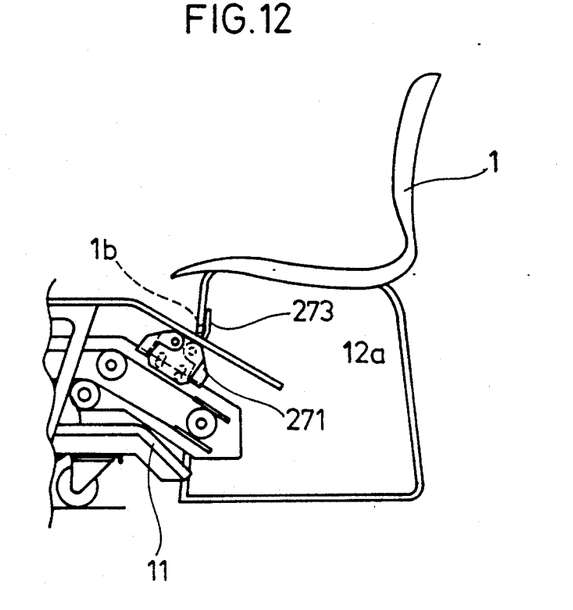
FIG. 12 is a side view schematically showing a chair in a hooked state at the start of collection.
Figure 13:
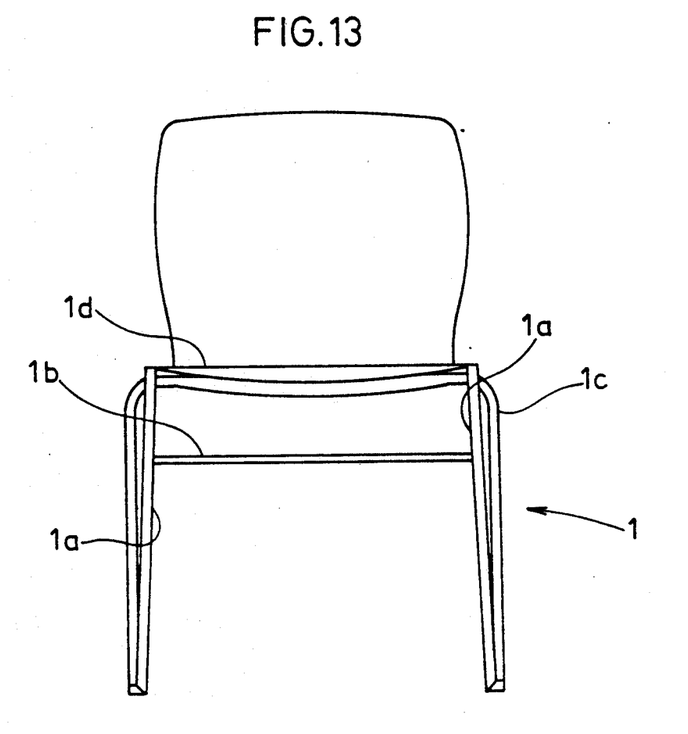
FIG. 13 is a front view of a chair which may be handled by the apparatus.

FIGS. 1 through 13 illustrate an apparatus for automatic placement and collection of chairs according to an embodiment of the present invention. FIG. 13 shows a chair 1 which may be handled by the apparatus. The chair 1 has a stretcher 1b at an upper position between front legs 1a of the chair 1, the stretcher 1b being vertically spaced apart from a seat 1d of the chair 1. The chair 1 is constructed to allow, when already loaded in its state of leaning frontward, a part of a subsequent chair to be inserted from behind into the space between rear legs 1c of the chair 1 so that the subsequent chair is stacked on the chair 1.

Figure 1A:
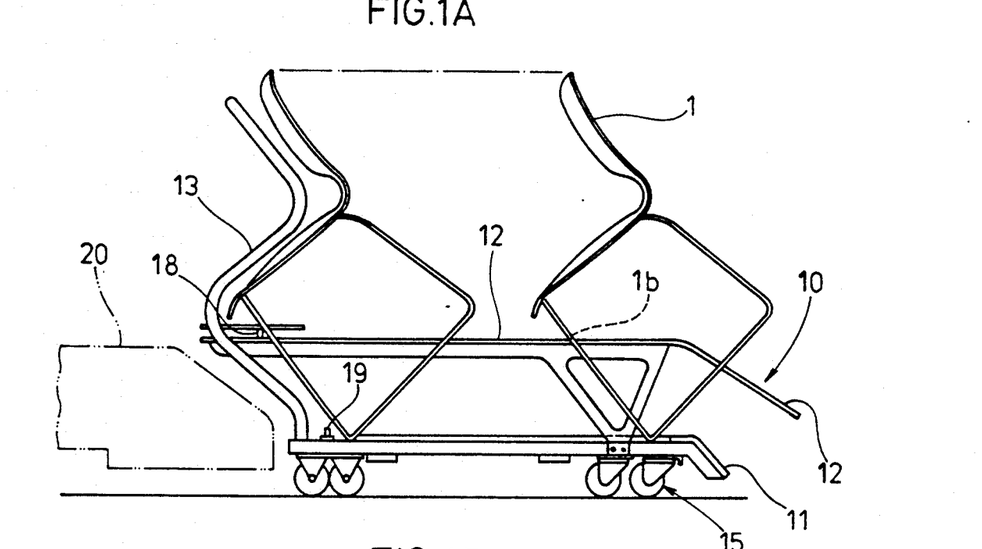
FIG. 1A is a side view of a dolly of an apparatus for automatic placement and collection of chairs according to an embodiment of the present invention.
Figure 1B:
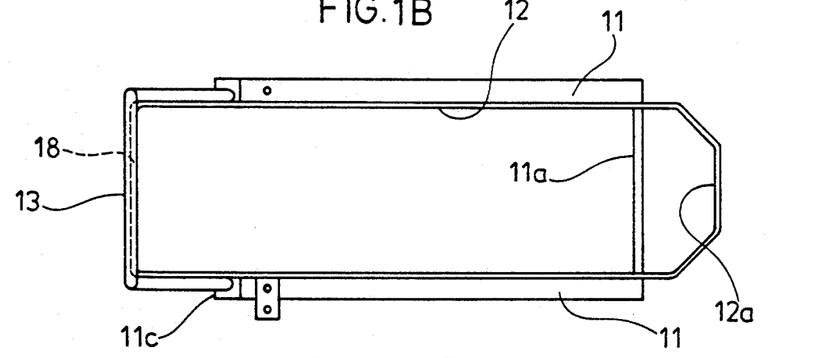
FIG. 1B is a plan view of the dolly.
Figure 1C:
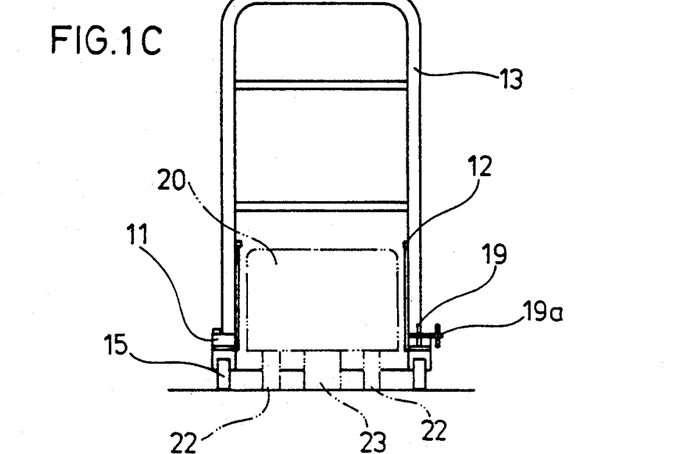
FIG. 1C is a front view of the dolly.

Referring to FIG. 1, the apparatus includes a dolly 10 allowing chairs 1 to be collected thereon. The dolly 10 has a base and a chair-guide bar 12. The base comprises a pair of rail-shaped base elements 11 on either lateral side of the dolly, the base elements 11 allowing the lower ends of the front legs 1a of the chairs 1 to be positioned thereon. The chair-guide bar 12 is provided horizontally on the base elements 11, and has a pair of rail-shaped bar elements supported above the base elements 11. The chair-guide bar 12 is capable of being inserted into the space between the front and rear legs 1a and 1c on one lateral side and those on the other side in such a manner as to support the stretcher 1b of each chair 1 in its state of leaning frontward. At the open end of the dolly at which chairs are loaded or unloaded (the end on the right side, as viewed in FIGS. 1A and 1B; hereinafter referred to as "the forward end"), the corresponding ends of the rail-shaped base elements 11 on either side are connected to each other by a link bar 11a, and, at the opposite end of the dolly (hereinafter referred to as "the rearward end"), the corresponding ends of the base elements 11 are connected to each other by a handle 13. The height of the bar elements of the chair-guide bar 12 above the base elements 11 corresponds to the height of the stretcher 1b of each chair 1 above the lower ends of the front legs 1a of the chair in its leaning frontward state. The distance between the bar elements on either side corresponds to the distance between the front legs 1a of each chair. On the reverse side of the base elements 11, casters, or wheels 15, are provided at positions of the elements 11 which are both longitudinally and laterally spaced from one another.

A rearward end portion of the chair-guide bar 12 is provided with stoppers 18. Each stopper 18 has a U-shaped guide groove so that, when the stretcher 1b of the chair leaning frontward and being loaded first is inserted into the grooves, the chair is stopped at a position slightly ahead of the rearward end of the dolly., The chair-guide bar 12 has a forward end portion 12a at which the distance between the bar elements decreases toward the forward end, and which slopes downward so that the forward portion 12a can be easily inserted into the space between the front legs 1a of a chair 1 on the floor from a position below and close to the stretcher 1b of the chair. Each of the base elements 11 has a forward end portion which slopes downward similarly and which projects forward by a shorter length. The forward end portions of the base elements 11 slope at a slightly greater angle than the forward end portion of the bar 12 in order that a chair 1 being placed can be easily raised from its leaning frontward position. At a position close to the rearward end of each base element 11, a pin hole capable of receiving a link pin 19 passed through a link plate 19a (best shown in FIG. 1C) so that a plurality of dollies 10 can be arranged side by side while connected to each other the link plate(s) 19a.

Figure 2:
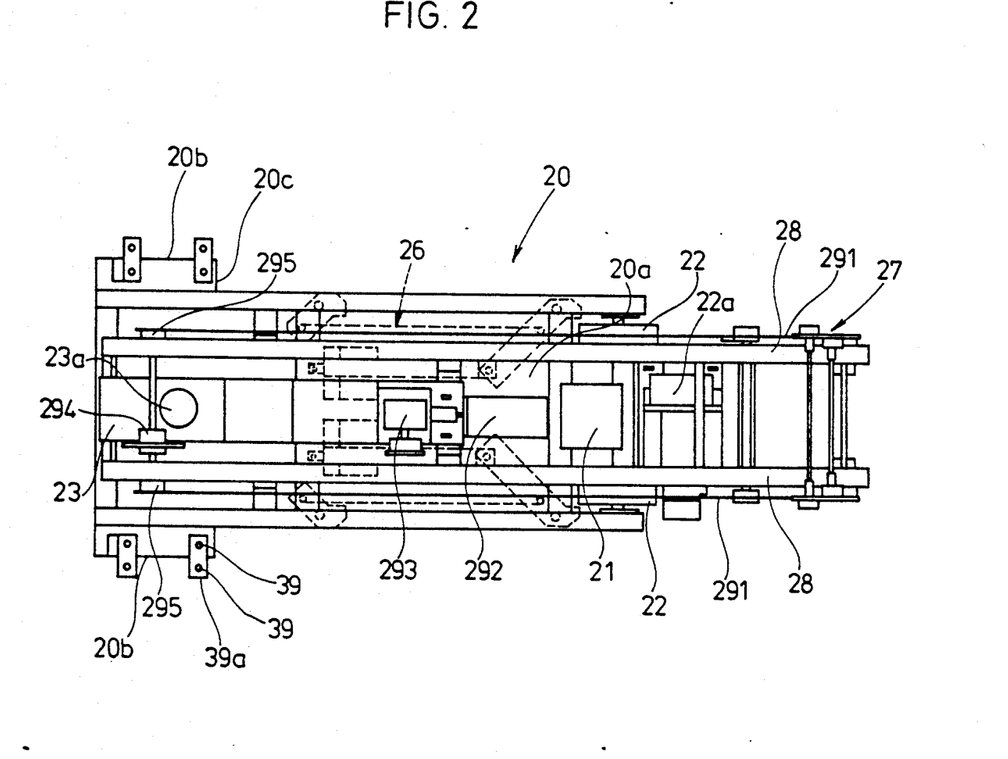
FIG. 2 is a plan view of a motive power unit of the apparatus.
Figure 3:
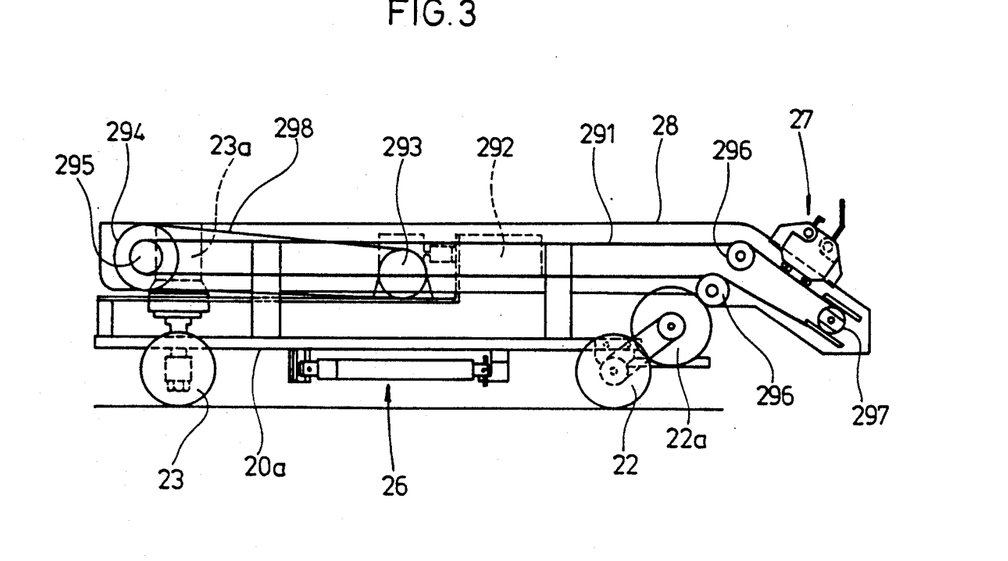
FIG. 3 is a side view of the motive power unit.

FIGS. 2 and 3 show a motive power unit 20. The motive power unit 20 incorporates a battery 21 as a power source for driving motors 22a and 23a. The motor 22a drives driving wheels 22 provided at lower positions on a frame 20a of the unit 20, whereas the motor 23a enables the control of a steering wheel 23. The widthwise dimension (from one lateral side to the other) of the frame 20a is a dimension corresponding to the distance between the base elements 11 of the dolly 10, and allowing the frame 20a to be inserted into the space between the base elements 11 in close proximity thereto. Stopper frames 20b project on either side of the frame 20a and from rearward end portions of the frame 20a (i.e, portions which can be disposed close to the rearward end of the dolly; the terms "rearward end" and "forward end" will be used in a similar manner to describe other parts of the motive power unit 20). Each stopper frame 20b is formed with pin holes capable of receiving link pins 39 passed through link plates 39a.

A pair of rails 28 are provided on the frame 20a (serving as a skeleton structure of the motive power unit 20) on either side of the frame 20a, and are supported in such a manner as to be capable of being disposed in a space below the chair-guide bar 12. A holding device body 27, consisting of a pair of body elements, is mounted on the rails 28. The holding device body 27 is secured to chains 291 arranged along the rails 28 and wound around guide gear 296, position-adjustable gear 297 and drive gear 295. The drive gear 295 is in meshing engagement with either end of a rotary shaft fixed to a drive wheel 294 which is in turn driven by a motor 292 capable of forward and backward rotation through reduction gear 293 and a chain 298.

Figure 4:
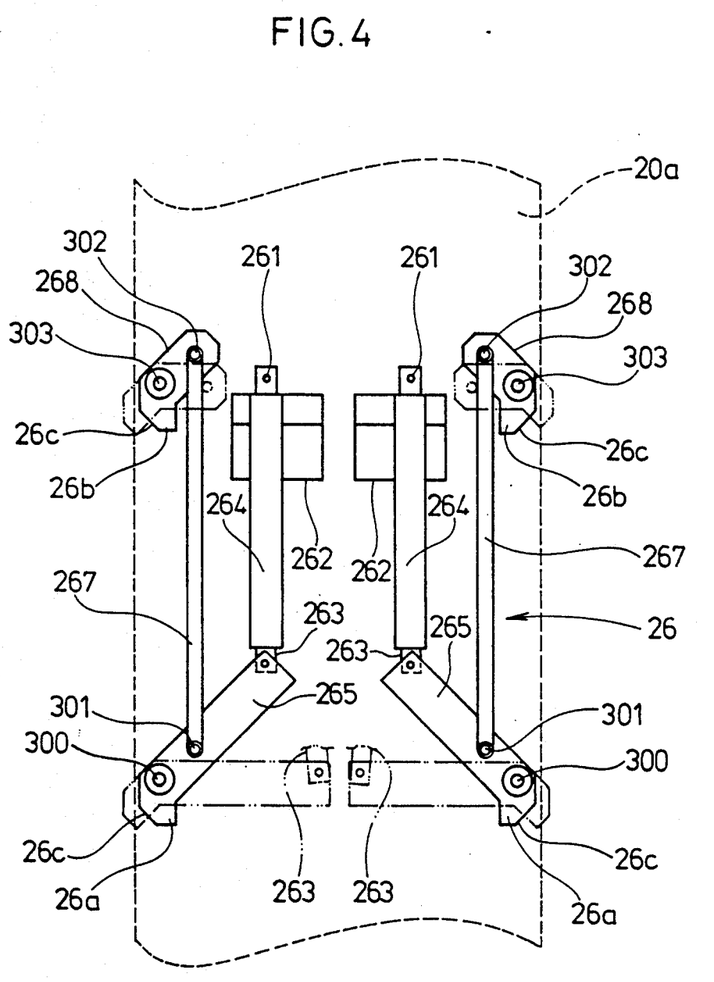
FIG. 4 is plan view of a dolly lifting device of the motive power unit.
Figure 5:
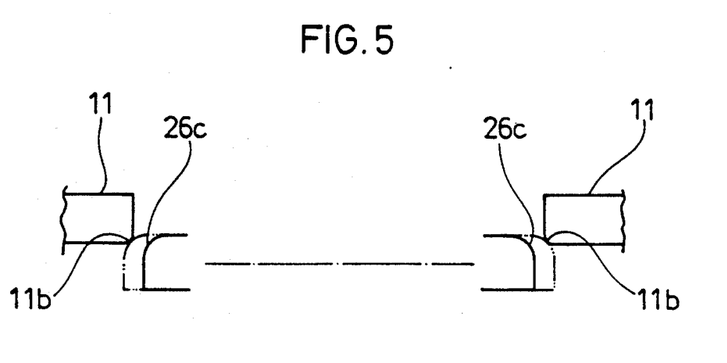
FIG. 5 is a front view of the essential parts of the dolly lifting device, illustrating the operation of the dolly lifting device.

As indicated by the broken lines in FIG. 2 and the solid lines in FIG. 3, a dolly lifting device 26, consisting of two lateral (i.e., left and right) lifting device elements, is mounted on the reverse side of the frame 20a. As shown in FIG. 4, each of the left and right lifting device elements comprises a power cylinder 264 having its rearward end hinged by a pin 261 and accommodating a screw rod 263 driven by a motor 262, an arm 265 whose laterally inward end portion is hinged to the projecting end of the screw rod 263 and whose laterally outward end portion is hinged to the frame 20a by a pin 300, a rod 267 whose forward end is hinged to an intermediate position of the arm 265 by a pin 301, and another arm 268 whose laterally inward end portion is hinged to the rearward end of the rod 267 by a pin 302 and whose laterally outward end portion is hinged to the frame 20a by a pin 303. The arms 265 and 268 obliquely extend, in their normal positions indicated by the solid lines, in laterally outward directions, and have driving portions 26a and 26b, respectively, which longitudinally project from the respective hinged positions of the arms so that the portions 26a and 26b are capable of functioning as swingable, dolly-lifting driving members. When the screw rod 263 is in its normal position indicated by the solid lines, the driving portions 26a and 26b are in their retracted, or laterally inward, positions. When the screw rod 263 advances while rotating about its own axis, the driving portion 26a is displaced by swinging to the position indicated by the two-dot-chain lines, while the other driving portion 26b is also caused to occupy the position indicated by the two-dot-chain lines by the linkage including the rod 267. As shown in FIG. 5, each of the driving portions 26a and 26b has its laterally outer end face formed as a driving surface 26c which bulges out as it slopes downward in such a manner that, in its displaced position, the surface 26c projects laterally outward. Consequently, when the driving surfaces 26c, provided at longitudinally and laterally spaced positions of the lifting device 26 are displaced laterally outward, the surfaces 26c abut on surfaces 11b to be pressed which are on the laterally inward edges of the base elements 11 (the elements 11 thus serve as the members to be pressed of the dolly 10) so that lifting occurs in accordance with the slope of the driving surfaces 26c. Each of the surfaces 11b is also formed as a surface sloped and bulged laterally outward. Since the length of the part of the arm 265 which is laterally inward of the position at which the arm is hinged by the pin 300 is adequately greater than the length of the part of the arm 265 which is laterally outward of the pin (300) hinged position, an adequate pressing force is achieved in accordance with the principles of a lever.

In the embodiment, the dolly lifting device may be such that a common motor is provided for the left and right driving mechanisms, or the driving members are capable of being displaced linearly in lateral directions and are driven by an actuator to linearly advance or retract.

Figure 6:
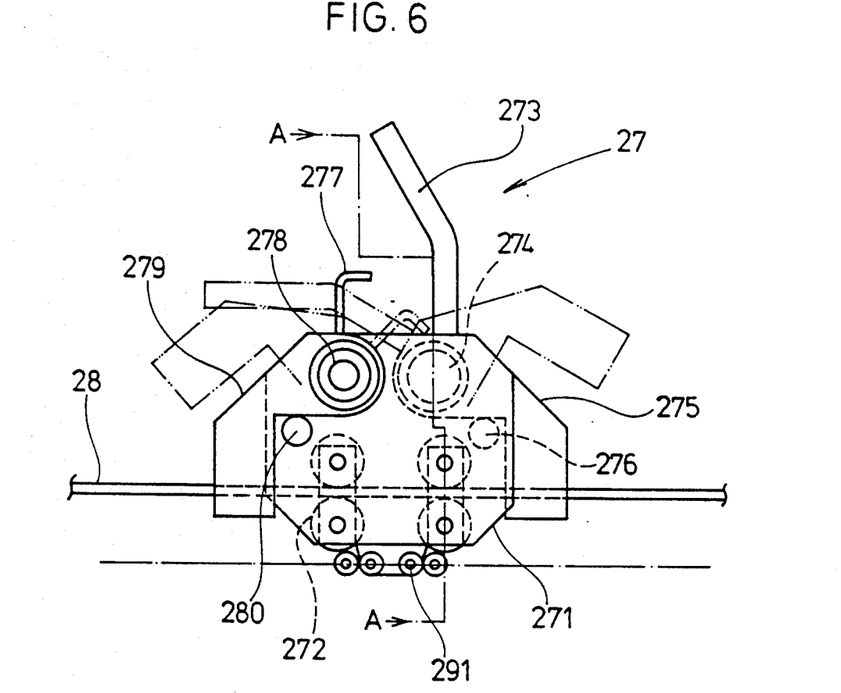
FIG. 6 is a side view of a holding device body of the motive power unit.
Figure 7:
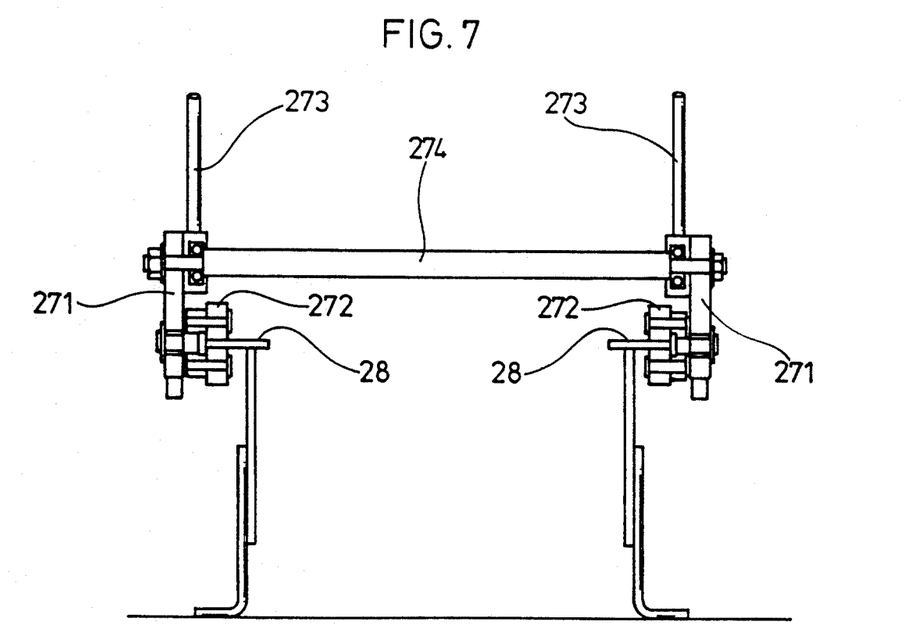
FIG. 7 is a sectional view taken along the line A—A shown in FIG. 6.

Each of the body elements of the holding device body 27 is provided in one of the rails 28, as shown in FIGS. 6 and 7. Each body element includes a carriage 271 secured to the associated chain 291 and capable of running on the associated rail 28 while holding the rail 28 between a plurality of rollers 272, and a placement hook 277 and a collection hook 273 which are swingably provided on the carriage 271, the hooks facing each other in the lengthwise direction of the rail 28 and having lengths sufficient for projecting upward from the chair-guide bar 12. The collection hooks 273 on either side are mounted to a common shaft 274 transversely extending in such a manner that the hooks 273 are swingable about the shaft 274, each collection hook 273 being provided with a first weight 275 extended away from the hook 273 and swingable toward and away from the carriage 271 about the shaft 274. The swinging of the weight 275 toward the carriage 271 is limited by a stopper pin 276 projecting from the carriage 271, whereby the weight 275 is adapted to restrain the hook 273 from swinging forward from its stretcher engagement position perpendicular to the rail 28. When the collection hook 273 has been pressed by the stretcher 1b of a chair and swung rearward, the weight 275 causes, after the passage of the stretcher 1b over the hook 273 to its engagement side, the hook 273 to return to its stretcher engagement position. Similarly, the placement hooks 277 are mounted to a common shaft 278 in such a manner as to be swingable about the shaft 278, each placement hook 277 being provided with a second weight 279. The swinging of the second weight 279 toward the carriage 271 is limited by a stopper pin 280 removably provided on the carriage 271, whereby the weight 279 is adapted to restrain the hook 277 from swinging rearward from its stretcher engagement position perpendicular to the rail 28. When the placement hook 277 has been pushed by a stretcher 1b and swung forward, the second weight 279 causes, after the passing of the stretcher 1b over the placement hook 277 to its engagement side, the hook 277 to return to its stretcher engagement position.

The motive power unit 20 has a control circuit (not shown), and is connected to a control box (not shown) via a cable so that command signals are supplied to the control circuit. This arrangement allows the motors 22a and 23a to perform driving and control for forward and backward travel as well as for steering. A lifting and descending operation by the dolly lifting device 26 is achieved by causing forward and backward rotation of the motors 262. The driving wheels 22 are provided with a rotational speed sensor by which the pitch of travel is detected. When a certain pitch of travel has been detected, the travel is automatically stopped, and the motors 292 perform driving and control of a collecting or placing operation. The timing of a placing or collecting operation is set employing sensors for detecting the moving position of the holding device body 27 on the rails 28 in combination with means such as sensors for detecting the contact between the body 27 and a chair.

When an operation is to be performed, a greater part of the motive power unit 20 is inserted into the dolly 10 from the rearward end of the dolly until the forward end faces 20c (shown in FIG. 2) of the stopper frames 20b abut on the rearward end faces 11c (shown in FIG. 1B) of the base elements 11 of the dolly. When the dolly lifting device 26 is started under this condition, the driving portions 26a and 26b are swung and displaced laterally outward so that the driving surfaces 26c of these portions press against the surfaces 11b at the laterally inward edges of the base elements 11 serving as the members to be pressed (the surfaces 11b being positioned slightly upward the surfaces 26c), thereby lifting the base elements 11. This lifting enables the dolly 10 to be supported by the motive power unit 20, and to smoothly travel to a placement position or collection position without being hindered by the movement of the casters 15.

Figure 8A:
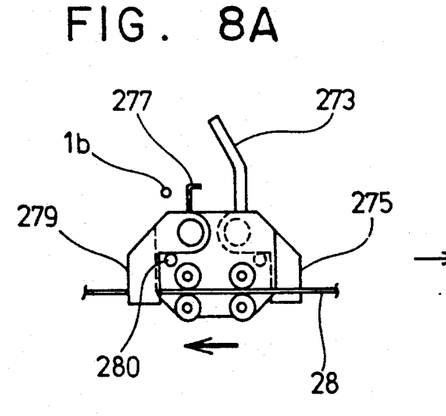
FIGS. 8A to 8G are side views of the holding device body, illustrating its operation during placement.
Figure 8B:
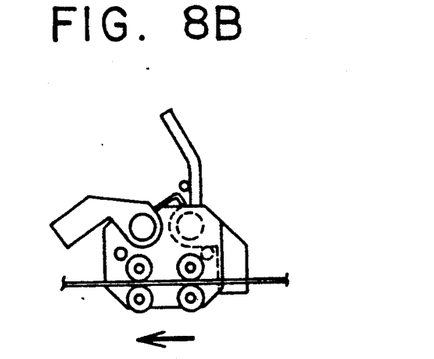
Figure 8C:
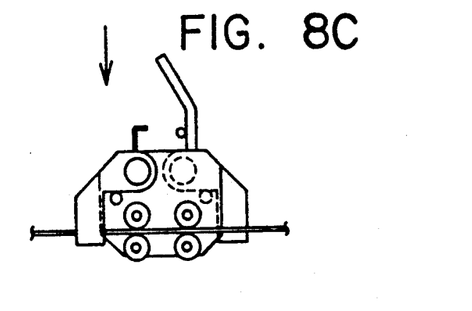
Figure 8D:
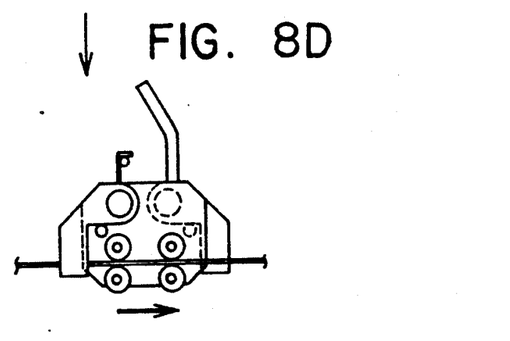
Figure 8E:
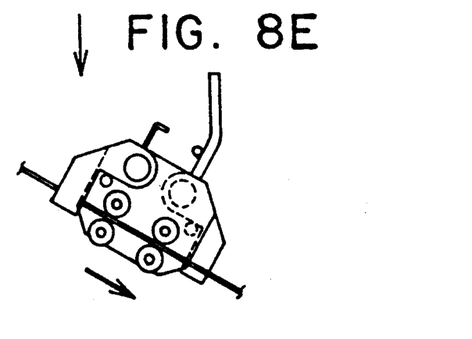
Figure 8F:
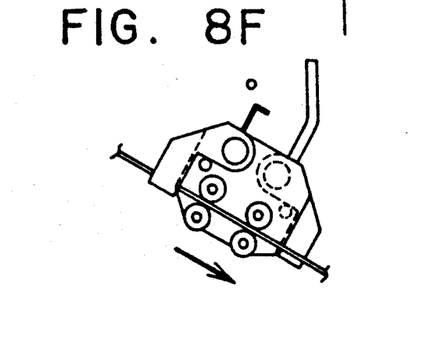
Figure 8G:
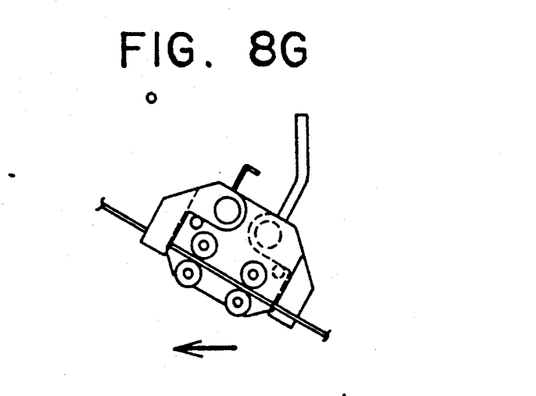
Figure 11A:
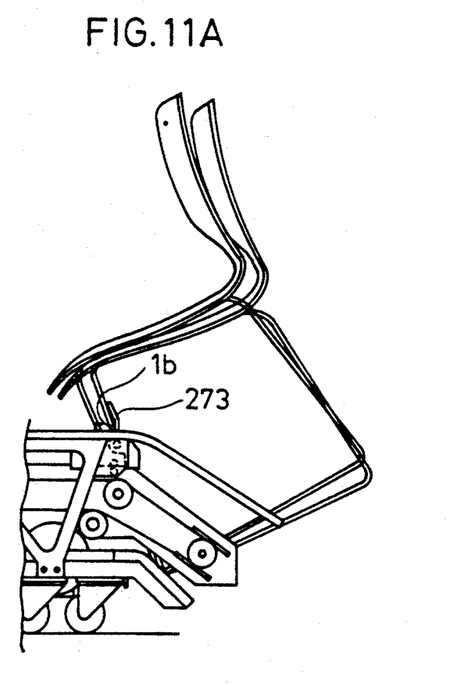
FIGS. 11A and 11B are side views schematically showing a chair being handled by the apparatus during placement.
Figure 11B:
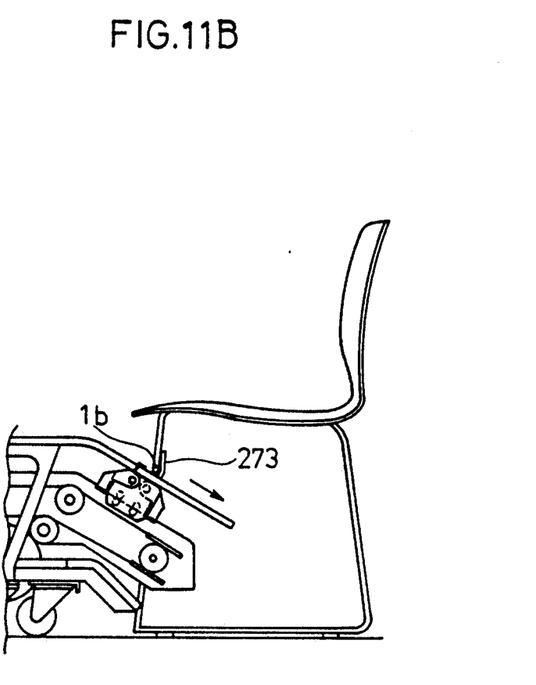

A placing operation will be described with reference to FIGS. 8A to 8G and FIGS. 11A and 11B. The holding device body 27 is retracted rearward from its standby position close to the forward end toward the stretcher 1b of one of the chairs 1 already collected on the chair-guide bar 12 which is positioned at the forward end of the stack of the chairs (see FIG. 8A). When the body 27 has been retracted to a position at which the placement hooks 277 abut on the stretcher 1b of the particular chair, the placement hooks 277 are swung against the weights 279 (FIG. 8B). When the stretcher 1b has passed over the hooks 277 to a position on the engagement side of the hooks 277, the hooks 277 are returned to their stretcher engagement position by the weights 279, and the body 27 is stopped (FIG. 8C). Subsequently, the holding device body 27 is advanced forward so that the hooks 277, confined by the stopper pins 280, engage with the stretcher 1b and push it forward (FIG. 8D). When the chair 1 has been moved to a forward end position at which the base elements 11 start sloping, the chair has its center of gravity moved and assumes a relatively upright position, resulting in the stretcher 1b abutting on the collection hooks 273 (FIG. 8E and FIG. 11A). When the body 27 has moved downward to a certain position, the chair 1 descends under its own weight and is placed on the floor (FIGS. 11B and FIG. 8F). The body 27 is further moved downward until the hooks 273 are positioned below the stretcher 1b (FIG. 8G). Then, the dolly 10 is retracted by a certain pitch of travel in order that a subsequent chair 1 can be placed by a similar operation. When all the chairs on the dolly 1 have been placed, the dolly 10 is moved to a predetermined position, and the dolly lifting device 26 is operated to descend the dolly 10 on the floor. Thereafter, another placing operation is, when necessary, performed similarly, using another dolly on which chairs have already been collected.

Figure 9A:
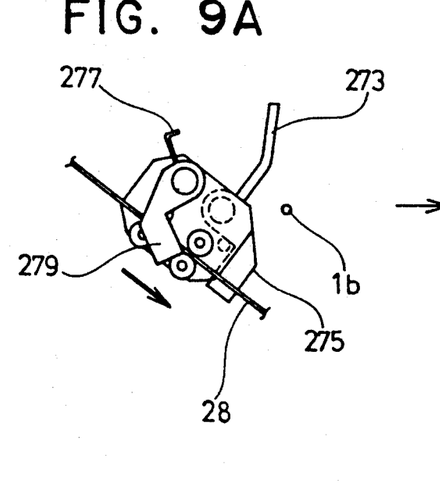
FIGS. 9A to 9F are side views of the holding device body, illustrating its operation during collection.
Figure 9B:
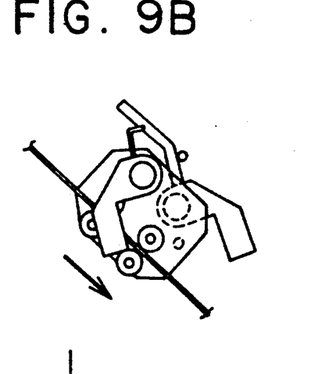
Figure 9C:
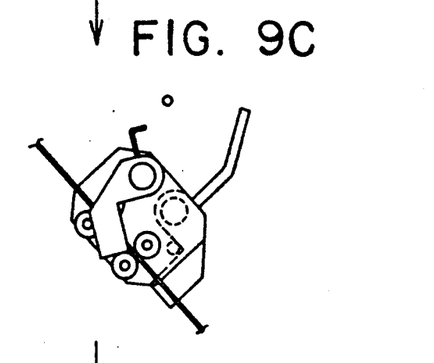
Figure 9D:
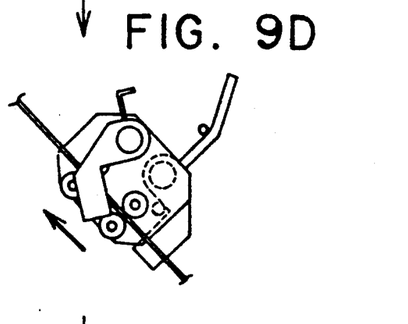
Figure 9E:
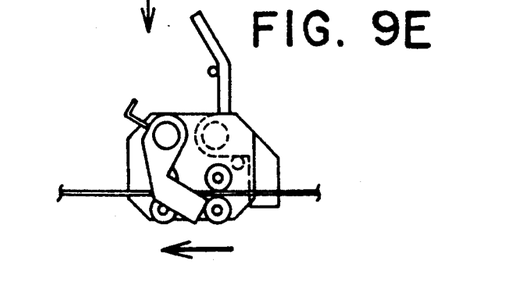
Figure 9F:
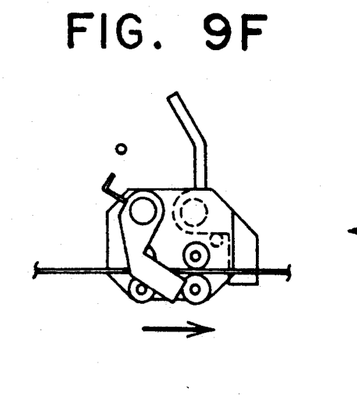
Figure 10:
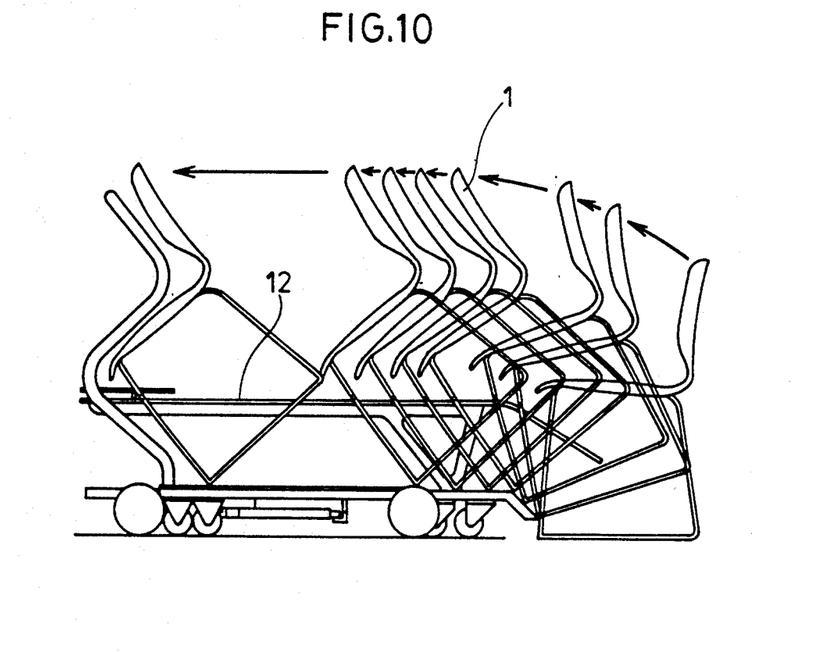
FIG. 10 is a side view schematically showing a chair being collected by the apparatus.

When a collecting operation is to be performed, the stopper pins 280 are removed so as to release the weights 279 from limitation by the pins 280. This enables the placement hooks 277 to be swung rearward to assume a lower position. During the operation, the holding device body 27 is advanced forward toward the stretcher 1b of a chair previously placed on the floor with the collection hooks 273 directed toward the stretcher 1b (FIG. 9A). When the hooks 273 have abutted on the stretcher 1b, they are swung rearward against the weights 275 (FIG. 9B). When the hooks 273 have reached their lowest position, the stretcher 1b passes over the hooks 273 to their engagement side, and the hooks 273 are returned, by the weights 275, to their position perpendicular to the rails 28 (FIG. 9C). Subsequently, when the holding device body 27 is moved rearward, the hooks 273 engage with the stretcher 1b, and the chair 1 leans frontward (FIG. 9D). When the body 27 has been moved to the horizontal section of the rails 28, the chair 1 has its center of gravity moved frontward to the lower ends of the front legs 1a so that the chair 1 is supported by the chair-guide bar 12 in a leaning frontward position. The stretcher 1b is at a position slightly above the placement hooks 277 in their low position (FIG. 9E). When the stretcher 1b has reached a position at which the chair 1 should be collected, the hooks 273 are released from their engagement with the stretcher 1b by moving the body 27 forward to perform the collection of a subsequent chair (FIG. 9F). FIG. 10 shows positions of a chair 1 in such a collecting operation. FIG. 12 shows a hooked state of a chair at the start of a collecting operation.

When a prescribed number of chairs 1 have been collected, the dolly 10 is moved to a predetermined position, and is descended on the floor by the dolly lifting device 26. Thereafter, an empty dolly 10 may be combined with and supported by a motive power unit 20 to perform a collecting operation in a similar manner.

Figure 14:
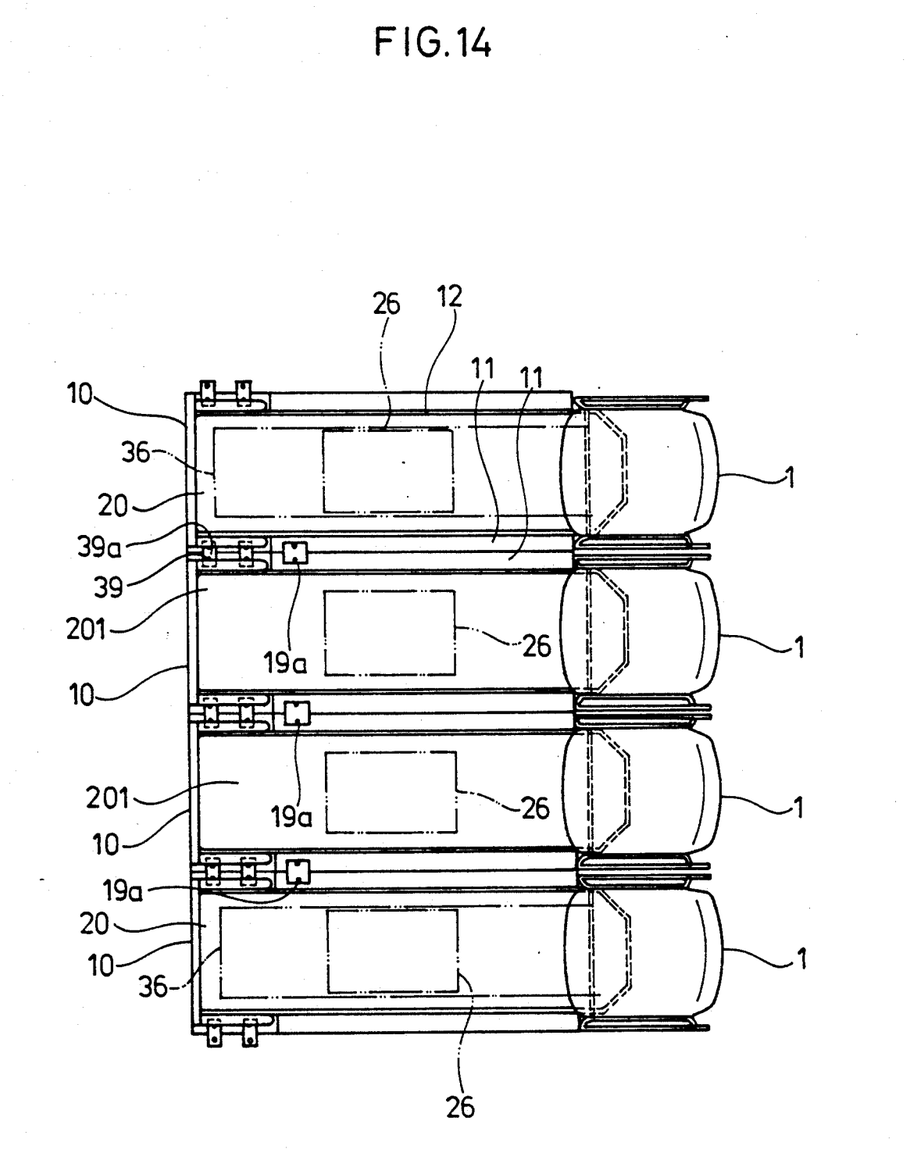
FIG. 14 is a plan view of another apparatus for automatic placement and collection of chairs according to another embodiment of the present invention, the apparatus including a plurality of dollies connected together.

FIG. 14 shows another embodiment in which the construction of the present invention is further developed. In FIG. 14, component parts which are the same as or correspond to those of the foregoing embodiment are denoted by identical reference numerals. In the second embodiment, the apparatus handles chairs in groups each comprising four chairs arranged side by side in a row and connected together. The apparatus includes two motive power units 201 each obtained by removing a chair holding device 36 from a motive power unit 20 identical to that in the foregoing embodiment and having driving and steering wheels 22 and 23, a dolly lifting device 26, and the chair holding device 36. The apparatus further includes four dollies 10 connected together in a row by link pins 19 and link plates 19a, and two motive power unit 20 having the above-described members. The motive power units 20 are mounted on those dollies at two outer positions of the row, while the motive power units 201 are mounted on the two intermediate dollies, the motive power units 20 and 201 being connected together by link pins 39 and link plates 39a. This arrangement allows the four dollies 10 to be lifted by the mated dolly lifting devices and to be moved simultaneously. A collecting or placing operation is performed by employing the two motive power units 20 at the outer positions in such a manner as to simultaneously operate the four chair-guide bars 12.

What is claimed is:

1. An apparatus for automatic placement and collection of chairs, each of said chairs having front and rear legs, comprising:
   a dolly allowing a large number of horizontally stacked chairs to be loaded thereon, said dolly having a base on which the front legs of said chairs can be positioned, and also having a horizontal chair-guide bar capable of being inserted between the front and rear legs of each of said chairs for supporting each of said chairs from below and for guiding each of said chairs in a direction corresponding to the direction in which each of said chairs is moved for placement and collection so that said chairs are stacked in a state of leaning forward with said front legs being positioned on said base and serving as support points; and
   a motive power unit removably mounting with said dolly, said motive power unit comprising:
      a dolly lifting device for lifting said dolly from a floor,
      a chair holding device having a holding device body for holding said chairs, said holding device body being mounted on a pair of rails capable of being disposed in a space below said chair-guide bar,
      a holding position controller for moving said holding device body between a chair-setting position on the floor and a chair-collecting position on the chair-guide bar, and
      driving and steering wheels for free movement on the floor.

2. An apparatus for automatic placement and collection of chairs according to claim 1, wherein said dolly lifting device, said chair holding device and said driving and steering wheels have actuators respectively belonging thereto, said actuators being driven by a battery incorporated in said motive power unit.

3. An apparatus for automatic placement and collection of chairs according to claim 1,
wherein a plurality of dollies are arranged side by side and connected together in such a manner that the chair-guide bars belonging to said plurality of dollies can be simultaneously inserted between the front and rear legs of a plurality of chairs arranged side by side and connected together, and
wherein a plurality of motive power units, arranged side by side and connected together, are removably mountable with said plurality of dollies with a dolly lifting device being provided in each of said motive power units and chair holding devices being provided in only those two motive power units at the two outer positions of the row.

4. An apparatus for automatic placement and collection of chairs according to claim 3,
wherein each of said dollies allows said plurality of chairs stacked in a horizontal direction to be loaded thereon, each of said plurality of dollies having a base on which the front legs of said plurality of chairs can be positioned, and also having a horizontal chair-guide bar capable of being inserted between the front and rear legs of each of said plurality of chairs for extending horizontally in the direction in which each of said plurality of chairs is moved for placement and collection and for supporting each of said plurality of chairs from below so that said plurality of chairs are stacked in their state of leaning forward with the front legs being positioned on said base and serving as support points, said chair-guide bar having a forward end portion sloping downward to serve as a port through which said plurality of chairs are loaded and unloaded, and
wherein said only two motive power units at said two outer positions are provided with said chair holding devices, each of said chair holding devices reciprocating along rails provided along the chair-guide bar for causing each of aid plurality of chairs to be held and moved between the chair-setting position on the floor and the chair-collecting position, said rails having forward end portions sloping in correspondence with the slope of said forward end portion of said chair-guide bar.

5. An apparatus for automatic placement and collection of chairs according to claim 1, wherein a receiving space is provided at a laterally intermediate position of said base of said dolly for receiving a base portion of said motive power unit when said unit is mounted,
said dolly lifting device having driving members provided at lateral positions on said base portion of said motive power unit and adapted to be displaced laterally outward from their initial position in such a manner as to press against members to be pressed which are provided as laterally inward surfaces of said base of said dolly on either lateral side of said receiving space, and also having an actuator for causing said each of said driving members to be displaced in a laterally outward direction, and
wherein at least one of the portions of contact of each of said driving members is formed with a sloped surface bulging laterally outward as it slopes downward in such a manner that said members to be pressed are lifted when said driving members are displaced laterally outward.

6. An apparatus for automatic placement and collection of chairs according to claim 1,
wherein aid chair-guide bar is capable of being inserted between the front and rear legs of each of said chairs for extending horizontally in the direction in which each of said chairs is moved for placement and collection and for supporting each of said chairs from below by a stretcher of each of said chairs which is between said front legs at a position vertically spaced from a seat of each of said chairs so that said chairs are stacked in their state of leaning forward with said front legs being positioned on said base and serving as support points,
said chair holding device reciprocating along rails provided along aid chair-guide bar for causing each of said chairs to be held and moved between the chair-setting position on the floor and the chair-collecting position,
said horizontal chair-guide bar having a forward end portion sloping downward to serve as a port through which said chairs are loaded and unloaded, said rails having forward end portions sloping in correspondence with the slope of said forward end portion of said chair-guide bar,
said chair holding device further including placement hook means provided at a rearward position and collection hook means provided at a forward position, said hook means facing each other in the lengthwise direction of said rails and being swingably hinged to carriage means mounted on said rails, said placement and collection hook means respectively projecting upward to first and second stretcher engagement positions above said chair-guide bar,
said chair holding device further including first weight means which is mounted on and extended downward from the hinged position of said placement hook means and which is adapted to return said placement hook means to said first stretcher engagement position after a stretcher pressing on said placement hook means from behind it has swung said placement hook means forward and then passed over said placement hook means, first stopper means which is adapted to restrain said placement hook means from swinging rearward so that said placement hook means maintains said first stretcher engagement position and which is movable in such a manner, that, during a collecting operation, said placement hook means is maintained at its position resulting from its swinging rearward from said first stretcher engagement position, second weight means which is mounted on and extended downward from the hinged position of said collection hook means and which is adapted to return said collection hook means to said second stretcher engagement position after a stretcher pressing on said collection hook means from ahead of it has swung said collection hook means rearward and then passed over said collection hook means, and second stopper means adapted to restrict the rearward swinging of said collection hook means so that said collection hook means maintains said second stretcher engagement position.

* * * * *

UNITED STATES PATENT AND TRADEMARK OFFICE
CERTIFICATE OF CORRECTION

PATENT NO. : 5,228,824
DATED : July 20, 1993
INVENTOR(S) : Akio Satoyoshi

It is certified that error appears in the above-identified patent and that said Letters Patent is hereby corrected as shown below:

Column 4, line 11, after "dolly." delete ",".

Column 4, line 29, after "other", insert --by--.

Column 9, line 40, before "plurality", delete "aid" and insert --said--.

Column 10, line 3, before "chair-guide", delete "aid" and insert --said--.

Column 10, line 16, before "chair-guide", delete "aid", and insert --said--.

Signed and Sealed this

Twenty-second Day of February, 1994

Attest:

BRUCE LEHMAN

Attesting Officer    Commissioner of Patents and Trademarks